Figure 9:
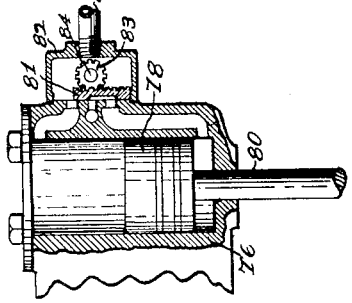

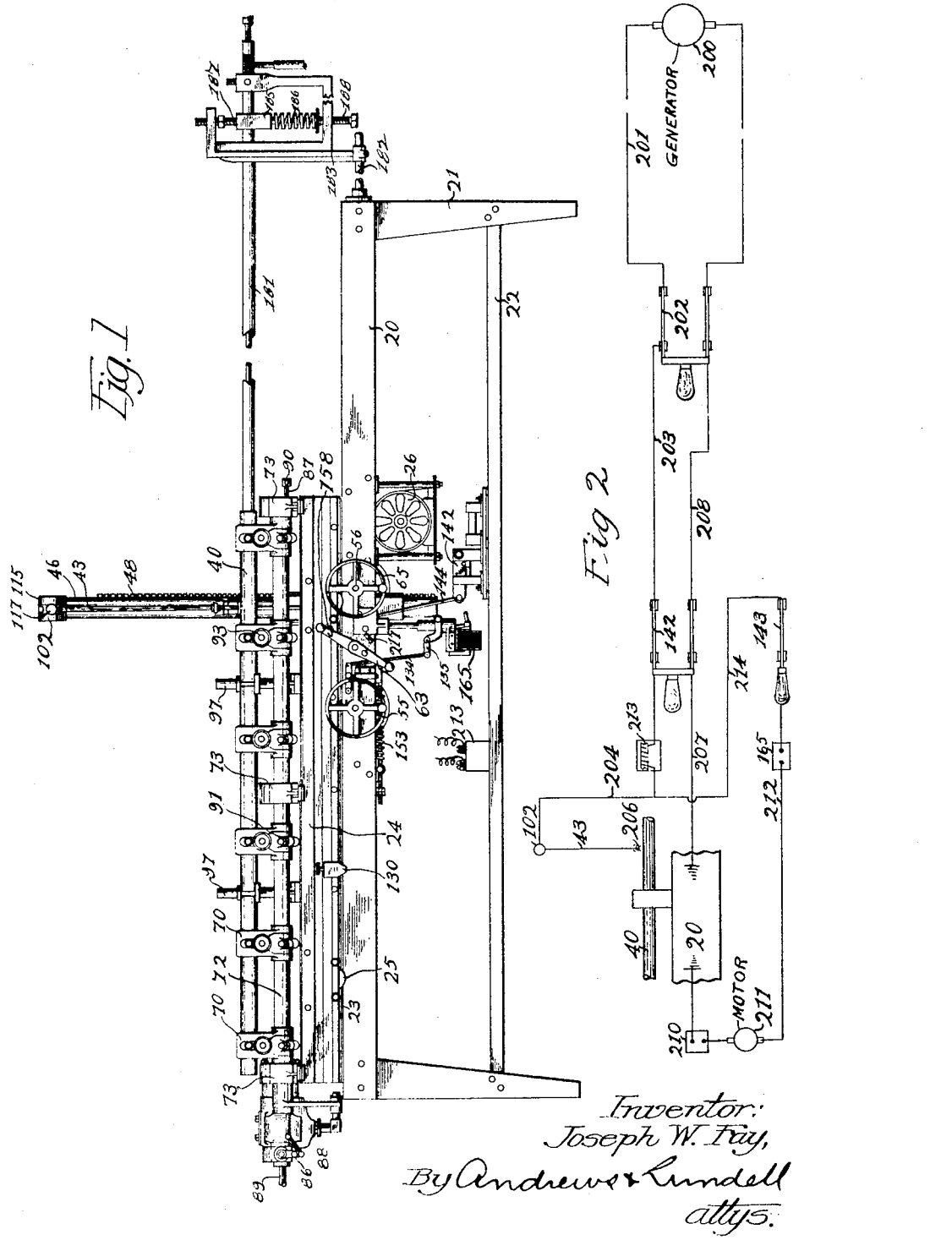

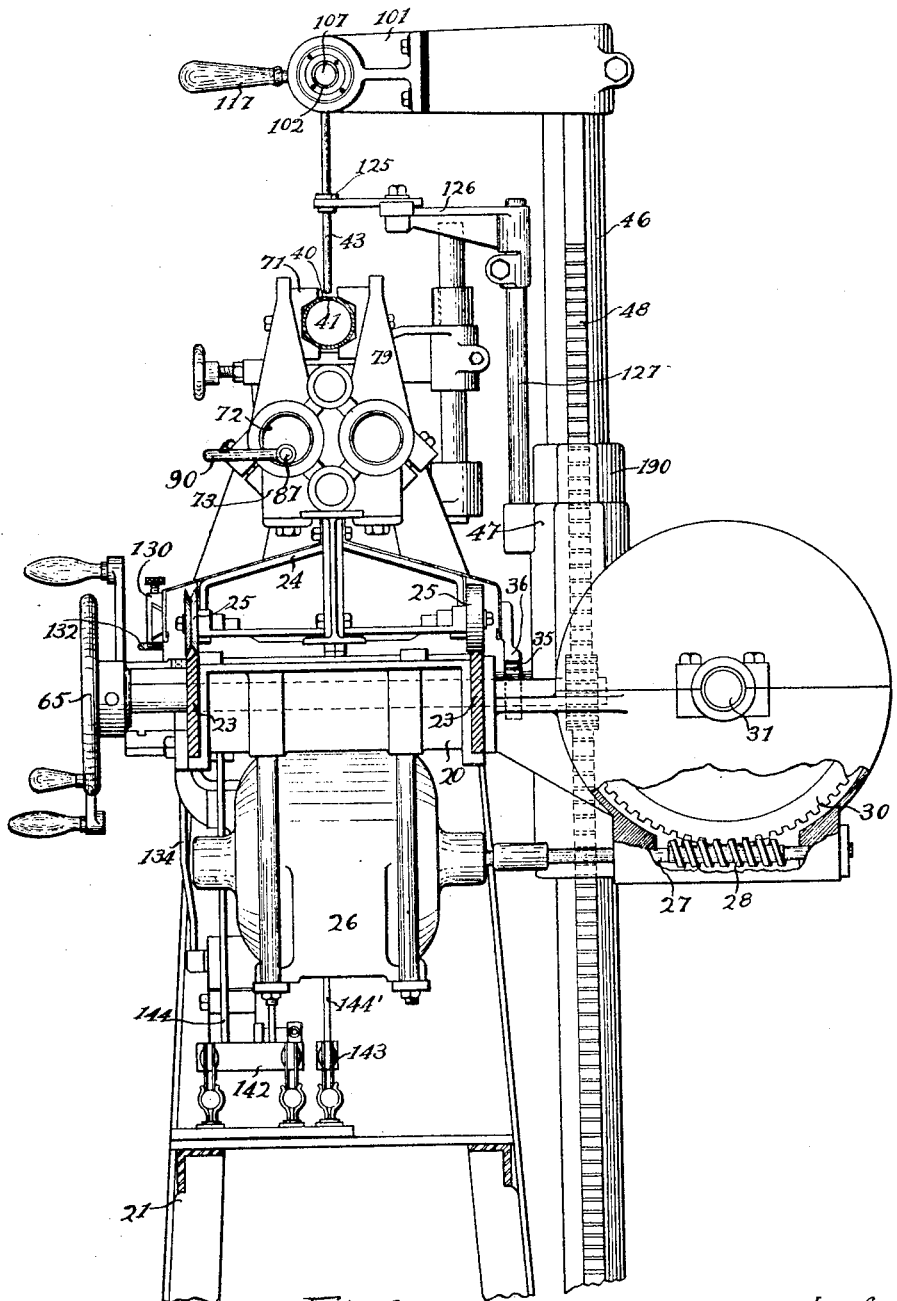

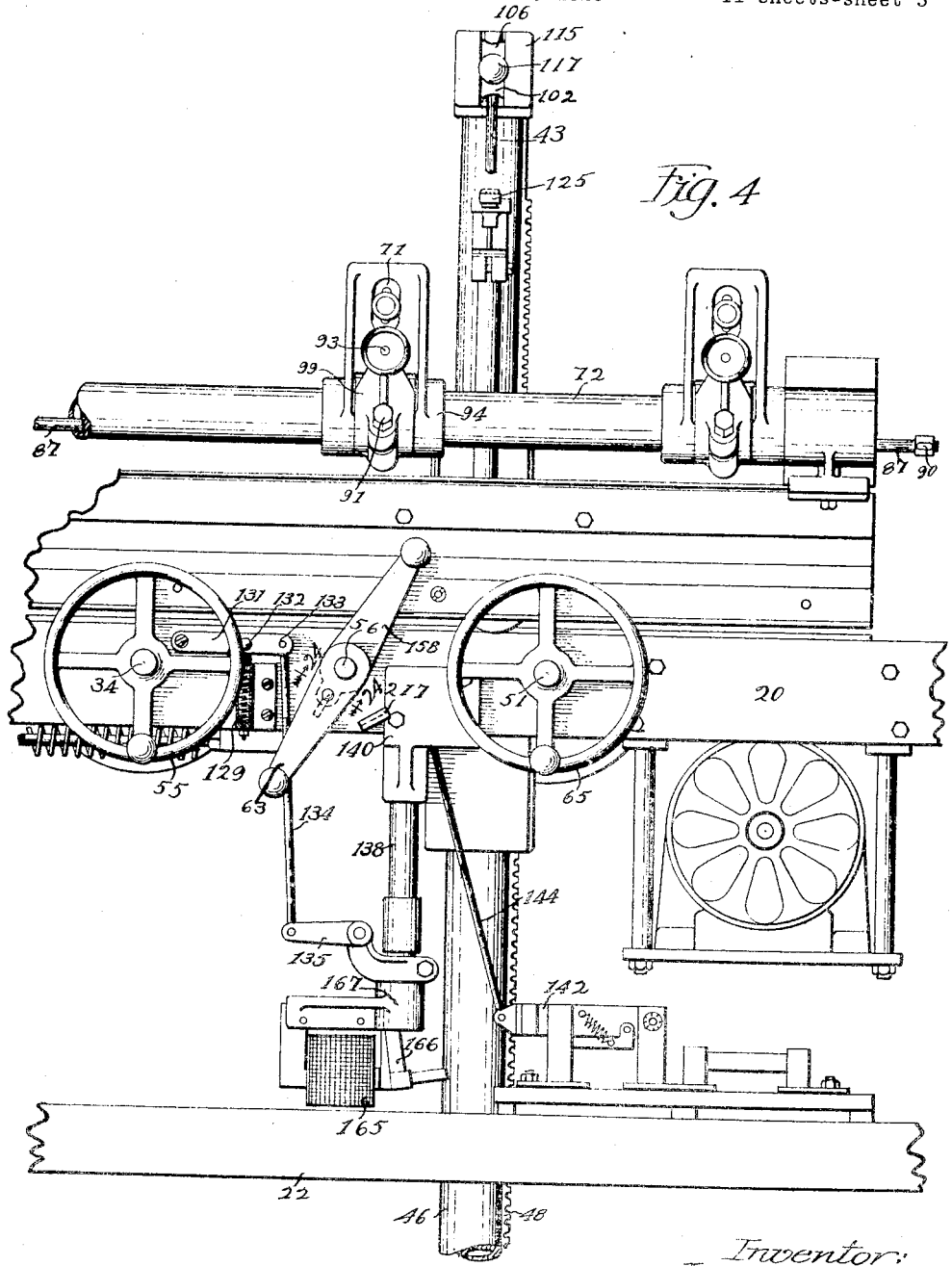

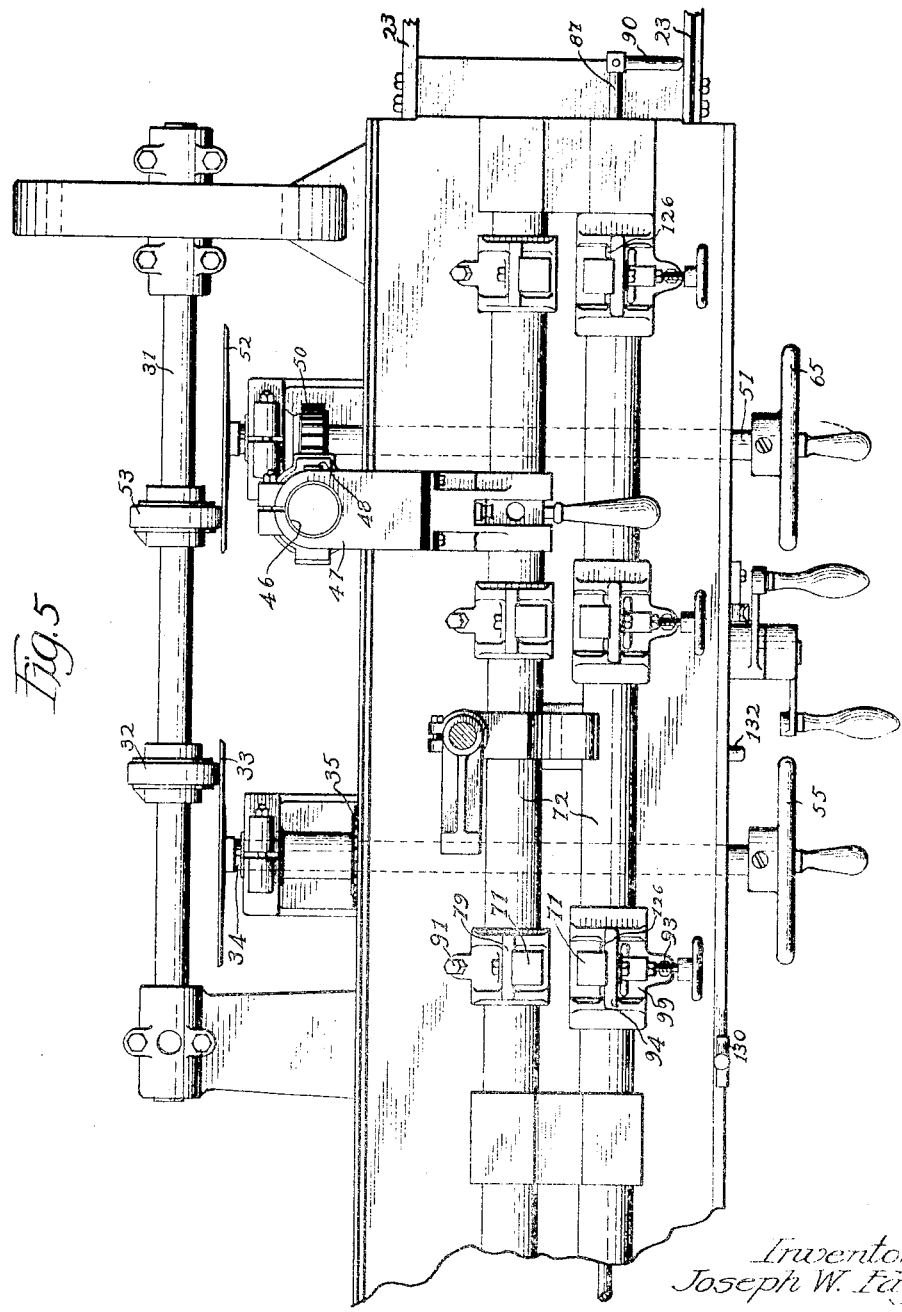

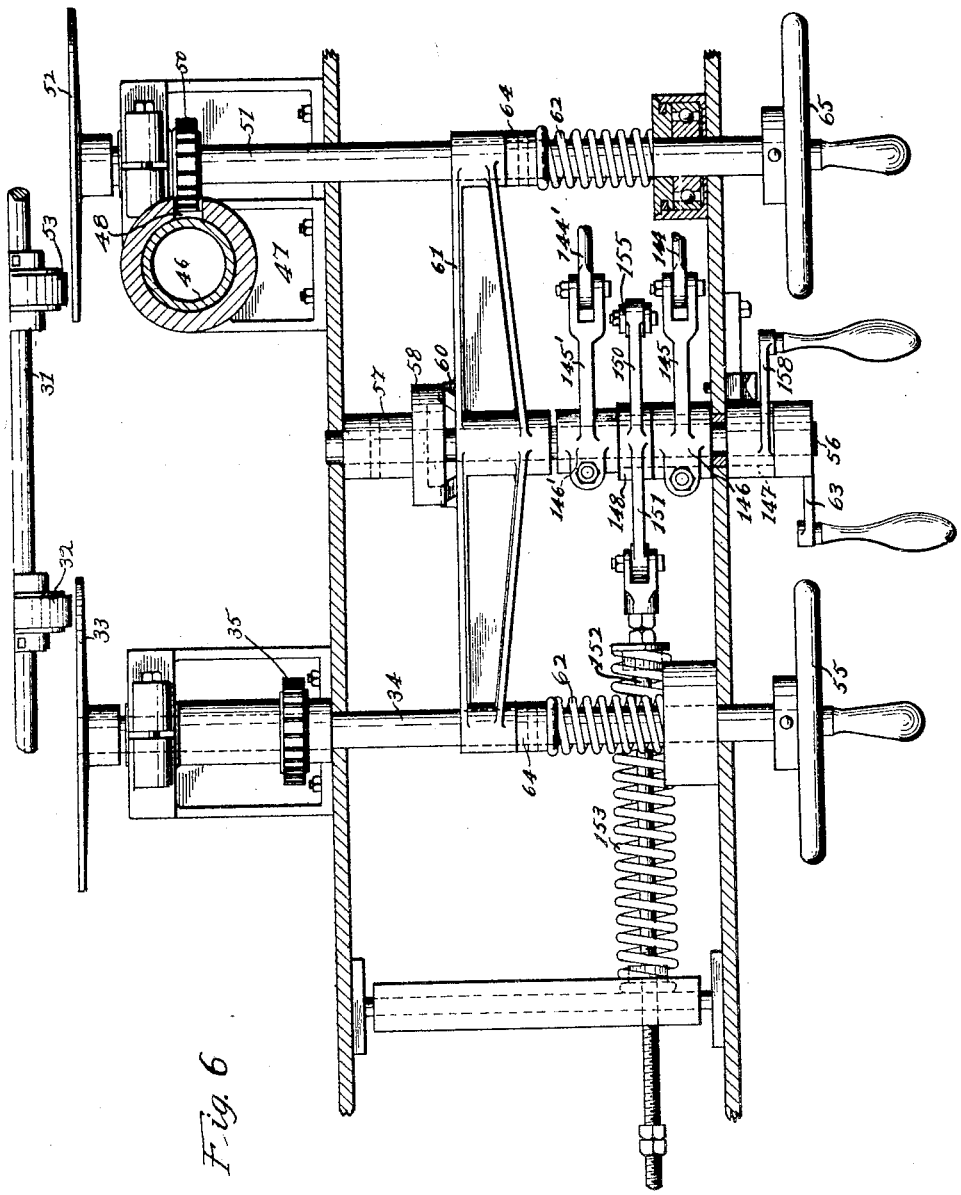

June 5, 1923.

J. W. FAY 1,457,513

ELECTRIC WELDING MACHINE

Filed April 19, 1920

11 sheets-sheet 6

Inventor:
Joseph W. Fay,
By Andrews & Lindell
attys.

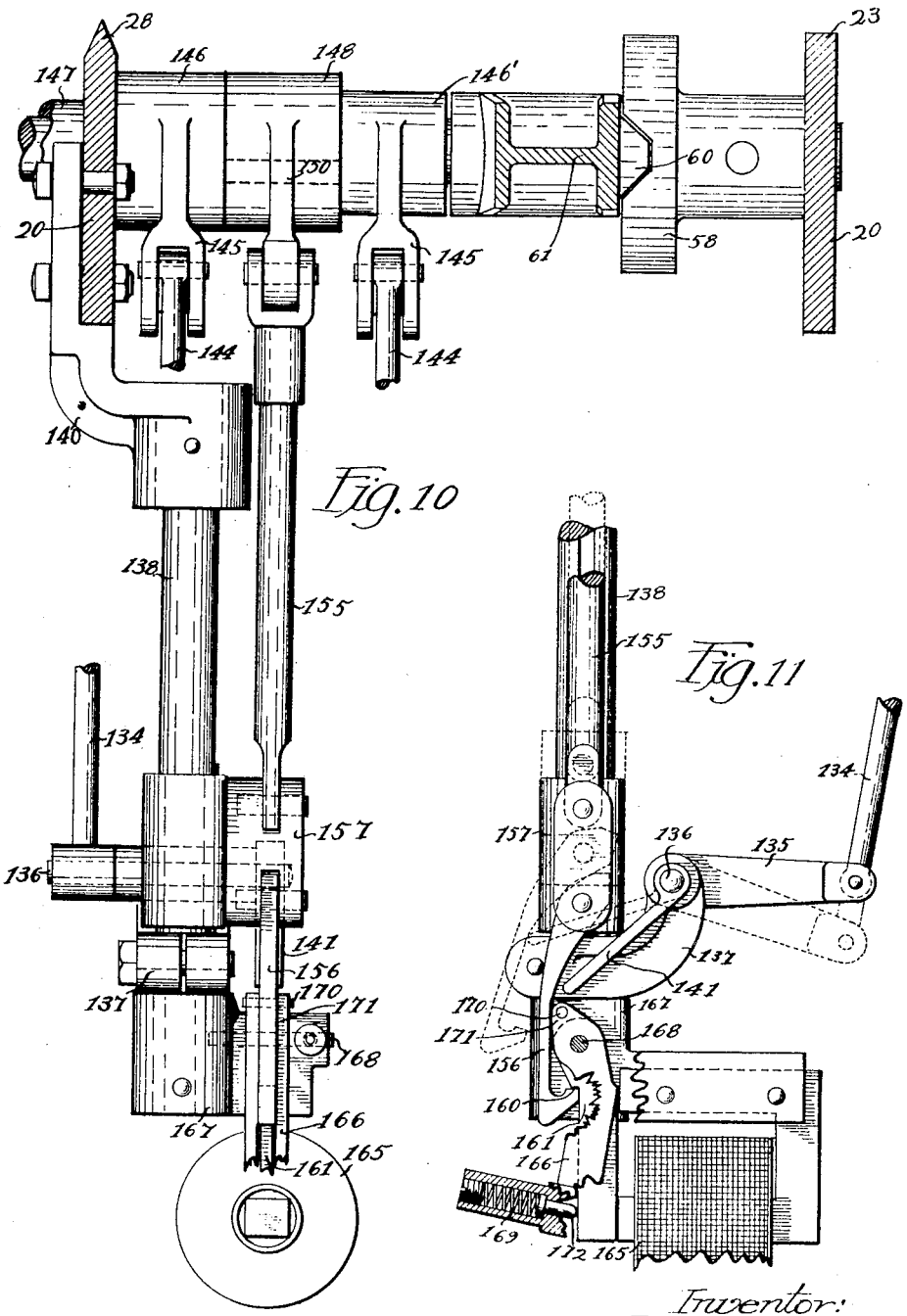

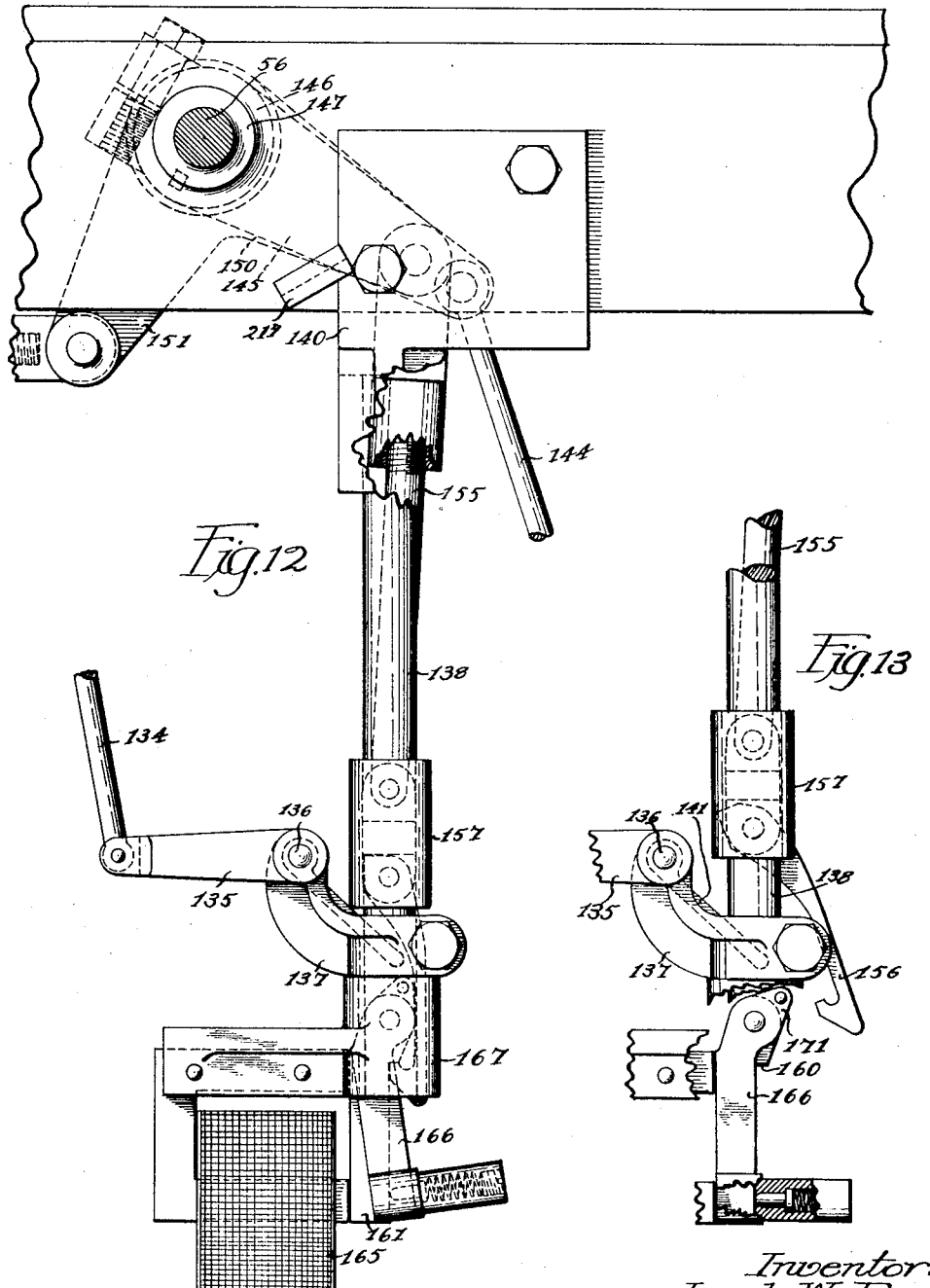

June 5, 1923.
J. W. FAY
1,457,513
ELECTRIC WELDING MACHINE
Filed April 19, 1920   11 sheets-sheet 9
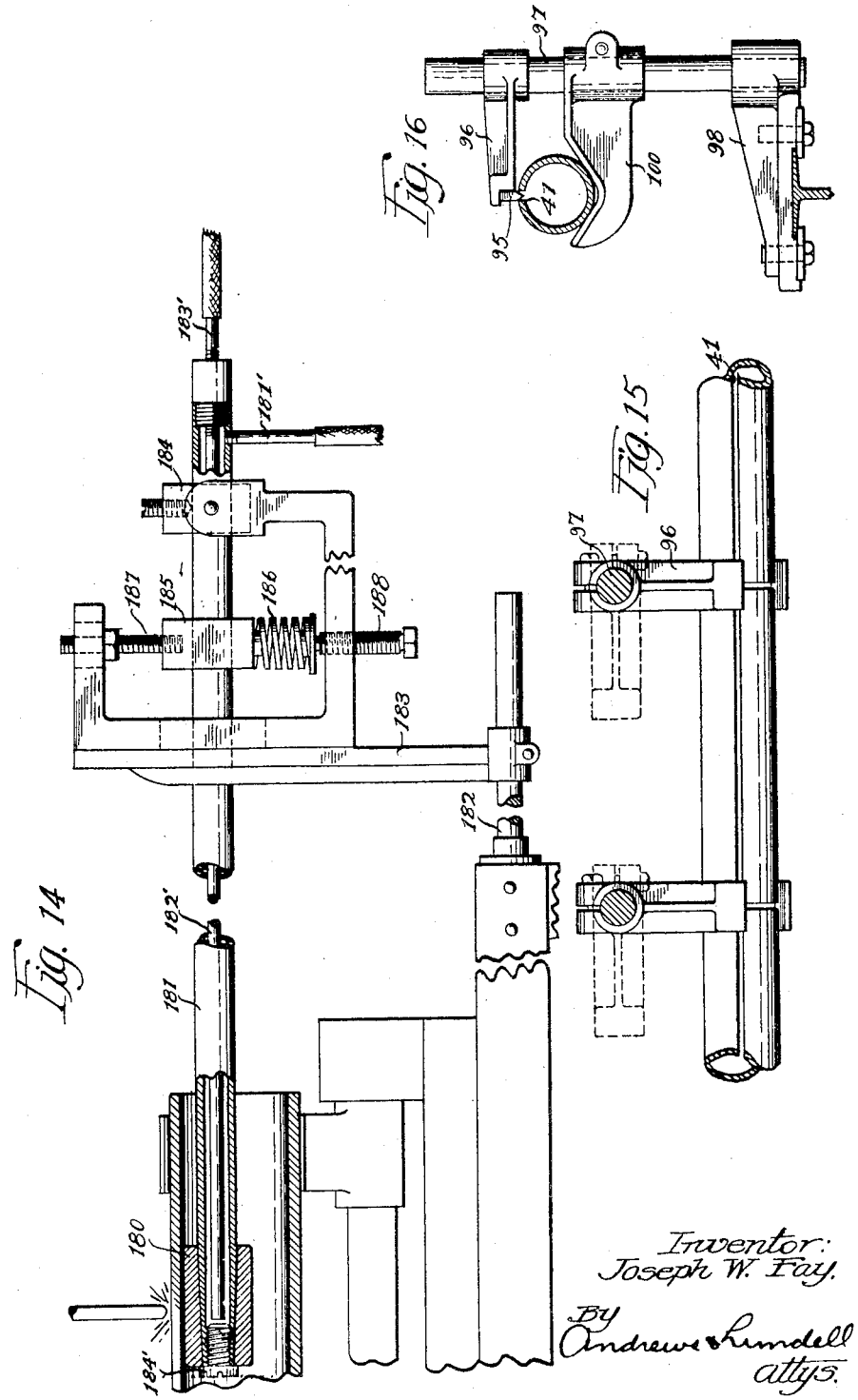
Inventor:
Joseph W. Fay,
By Andrews & Lundell
attys.

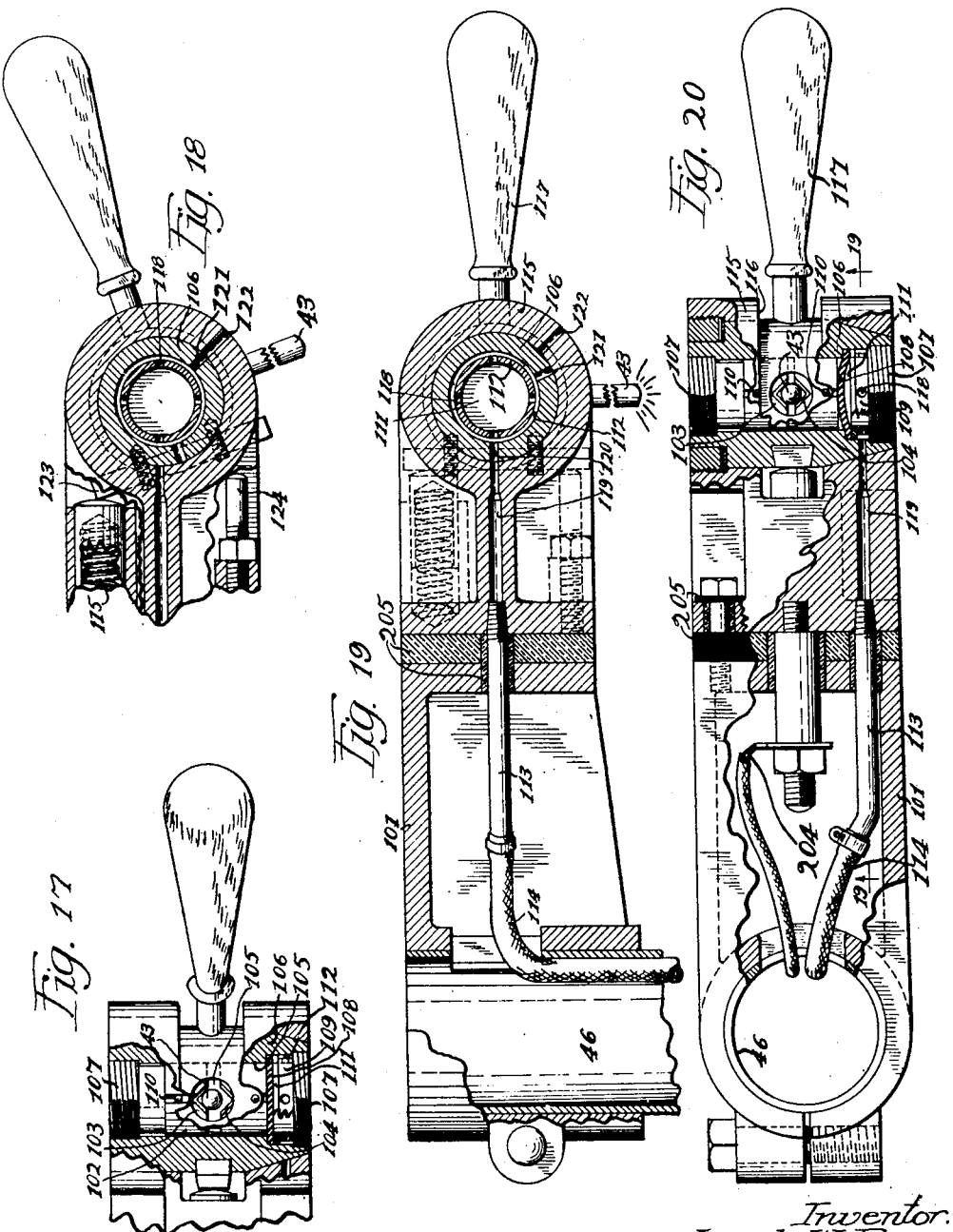

June 5, 1923.

J. W. FAY 1,457,513

ELECTRIC WELDING MACHINE

Filed April 19, 1920  11 sheets-sheet 11

Inventor:
Joseph W. Fay,
By Andrews & Lindell
Attys.

Patented June 5, 1923.

1,457,513

UNITED STATES PATENT OFFICE.

JOSEPH W. FAY, OF MILWAUKEE, WISCONSIN, ASSIGNOR TO FRED PABST COMPANY, A CORPORATION OF WISCONSIN.

ELECTRIC WELDING MACHINE.

Application filed April 19, 1920. Serial No. 374,817.

*To all whom it may concern:*

Be it known that I, JOSEPH W. FAY, a citizen of the United States, residing at Milwaukee, in the county of Milwaukee and State of Wisconsin, have invented certain new and useful Improvements in Electric Welding Machines, of which the following is a specification.

This invention relates to electric arc welding machines, and it has for its object the production of an arc welding machine which carries out very completely the welding of many articles, particularly where the welding is performed by means of a welding electrode and long seams or joints are to be automatically welded. It has for a further object the production of various devices for assisting in carrying out the welding process, so as to produce more efficient and perfect work, and to more completely and automatically control the various steps of the process. Other objects of the invention will be apparent from a consideration of the accompanying drawings and the following description thereof.

Figure 8:
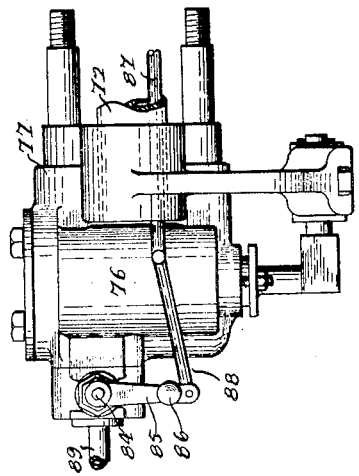
Figure 7:
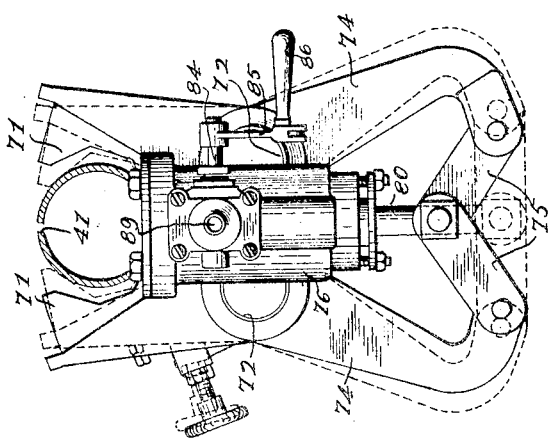
Figure 21:
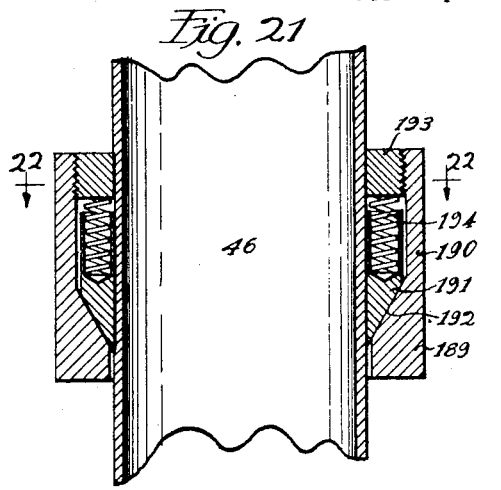
Figure 22:
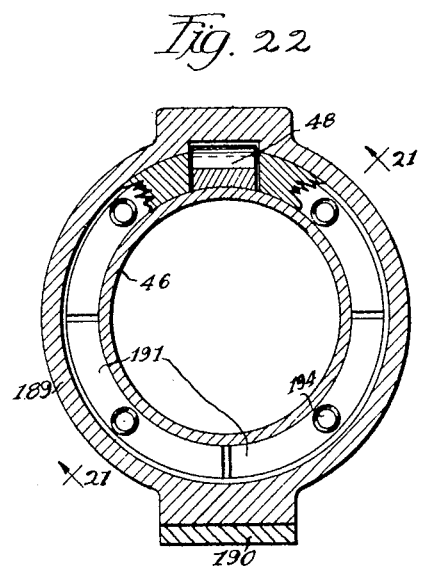
Figure 23:
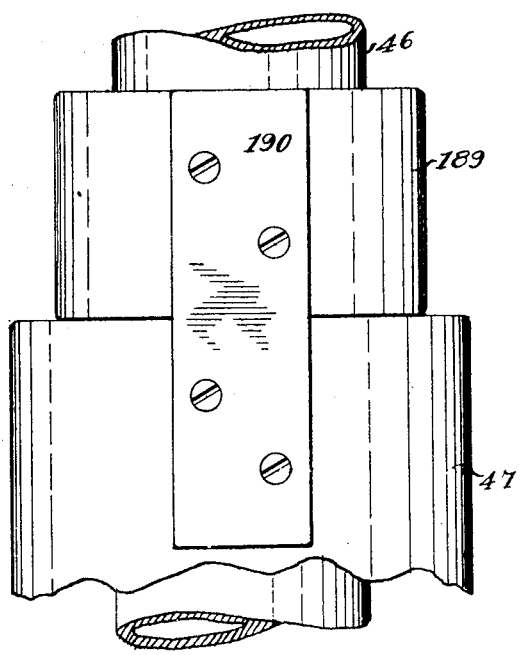
Figure 24:
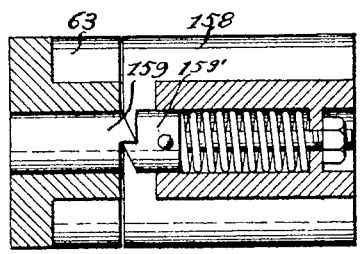

Fig. 1 is an elevation of a welding machine which embodies the features of my invention; Fig. 2 is a diagrammatic view of the electric system of the machine; Fig. 3 is an enlarged end elevation of the machine; Fig. 4 is an enlarged elevation of the central portion of the front of the machine; Fig. 5 is an enlarged plan view of the central portion of the machine; Fig. 6 is a longitudinal sectional plan view of the central portion of the machine; Figs. 7, 8 and 9 are detail views of the work clamping mechanism of the machine; Figs. 10, 11, 12, and 13, are detail views of the automatic means for stopping the operation of the machine; Fig. 14 is a detail elevation partly in section of the weld chilling means; Figs. 15 and 16 are detail views of the seam guiding means of the machine; Figs. 17, 18, 19, and 20, are enlarged detail sectional views of the electrode clamping means of the machine. Fig. 19 being a sectional view along the line 19—19 of Fig. 20; Figs. 21, 22, and 23, are detail views of a friction device used on the electrode support, Fig. 21 being a sectional view along the line 21—21 of Fig. 22, and Fig. 22 being a sectional view along the line 22—22 of Fig. 21; Fig. 24 is a detail view of part of the manual operating mechanism of the ma- chine, being a sectional view along the line 24 of Fig. 3.

It is frequently desired, especially in manufacturing standard articles, to weld a large number of pieces which are substantially uniform in size and in which the seam or joint to be welded is long and substantially uniform and straight. In such cases it is desired to have automatic machinery for carrying out the welding process, which can be quickly and conveniently adapted to hold and manipulate the particular pieces which are to be welded; and the machine which I have invented is mainly for use in such cases. It is understood, however, that the machine may be applied to the welding of various irregularly shaped seams and for repair work or other similar work where the pieces welded are not necessarily uniform in size and shape. For the purpose of illustrating my invention I have applied it in this instance to the welding of the seam of a plurality of tubes, in which the tubes are of substantially uniform diameter and the seams are uniform in width and extend parallel with the axis of the tubes.

In general the machine consists of a frame work 20 mounted on legs 21, the legs being connected by means of bars 22; what may be called a long narrow table or support for the various elements of the machine being thus provided. Mounted on the frame are guideways 23 upon which is mounted for longitudinal movement the carriage 24, the carriage being supported by rollers 25 running upon the guides 23; some of the rollers having flanges to prevent their passing off of the guides. Means are provided for moving the carriage longitudinally on the table. Although any suitable driving means may be used yet I prefer for the purpose an electric motor 26, suitably mounted on the frame-work, connected to a worm shaft 27 which has mounted thereon a worm 28 which meshes with the worm wheel 30. The worm wheel 30 is mounted on the shaft 31 which is the main driving shaft of the machine. Fixed to the shaft 31 is a friction wheel 32, (Fig. 4) which, when the machine is operating, rotates the friction wheel 33 mounted on a shaft 34. Fixed to the shaft 34 is a pinion 35 which meshes with a rack 36 (Fig. 3) fixed to the carriage of the machine. It will thus be seen that as the motor operates, if the friction wheels are in proper contact, the carriage 24 will be moved longitudinally on the frame, the worm gearing reducing very materially the speed of the carriage with reference to the speed of rotation of the motor.

The tubes 40 to be welded are mounted longitudinally on the carriage, by means hereinafter described, with the seams 41 to be welded placed upwardly; and, as the carriage is moved on the frame, the seams are moved along under the welding electrode 43. By having the electrode connected to one terminal of a source of suitable electric energy, and the tube itself connected, by means of the grounded frame, to the other terminal of the supply of electric energy, and by properly manipulating the electrode in starting the electric arc, the seams, in a well known manner, will be welded by moving the seams horizontally under the electrode and by properly feeding the electrode as the metal of the electrode is consumed during the welding process. The electric circuits of the machine are described hereinafter. The horizontal movement of the seam is provided for by the operation of the motor in the manner hereinabove described.

Feeding of the electrode towards the seam, as the metal of the electrode is consumed in the welding process, may be provided for in any suitable manner. I prefer for the purpose the following means: The upper end of the electrode is supported by means of a clamp 102 hereinafter described, which is fixed to a supporting beam 46. The beam 46 is mounted for vertical movement on the frame of the machine by means of a bracket 47 (Figs. 5 and 6). Fixed to the beam 46 is a rack 48 which meshes with the pinion 50 fixed upon the shaft 51. Also fixed to the shaft 51 is the friction wheel 52, which, when the machine is operating, is operatively in contact with the friction wheel 53, which is fixed to the shaft 31, the shaft 31 being operated, in the manner hereinabove described, by the motor 26.

In practice, by the use of various devices hereinafter described, the right hand end of the seam to be welded, is brought immediately under the end of the electrode 43, and the electrode is then brought in contact with the metal of the tube 40, the welding circuit switch is then closed, so as to form the arc; the electrode is then quickly removed to the proper distance, and the welding process proceeds, the motor moving the tube horizontally to the right, and at the same time lowering the electrode the proper amount to maintain substantially uniform the welding arc, and to supply the welding metal. However, in order to properly manipulate the electrode and the article to be welded in starting the weld, and for other purposes, various devices are desired.

It is desirable to be able to manipulate both the carriage and the electrode manually, not only for the purpose of properly adjusting the various elements in starting the weld, but in case of any irregularity in the operation during the welding process. Any suitable means may be provided for manually moving the carriage horizontally. I prefer for the purpose the hand wheel 55 (Fig. 6) which is fixed to the shaft 34. The hand wheel 55 has control of the movement of the carriage, by means of the pinion 35, when the friction wheels 32 and 33 are separated. In order to separate the friction wheels any suitable means may be provided. I prefer the use of a shaft 56, which is rotatably mounted in the frame of the machine, and transversely thereof, and which is held against longitudinal movement by means of the collar 57 which is fixed to the shaft. Also fixed to the shaft, in this instance integral with the collar 57, is a cam wheel 58 which coacts with the cam 60 fixed to a cross beam 61. The cross beam 61 is slidably mounted on the two shafts 34 and 51. The springs 62 at all times press the cam 60 against the cam wheel 58; and, when the cams are not coacting, the cross bar 61 will be forced backwardly by the springs so as to allow the friction wheels 32 and 33, and also 53 and 52, to be in contact. But when the shaft 56 is rotated, by means of the crank 63, so as to bring the two cam surfaces into coaction, the cross beam 61 will be forced forwardly carrying with it the shafts 34 and 51 by means of the collars 64 fixed to the respective shafts. Hence, when it is desired to operate the carriage manually, the shaft 56 is rotated by means of the crank 63; the friction wheels are thus separated, and the operator is at liberty to move the carriage freely to any position desired by means of the hand wheel 55. While it is desirable to separate the friction wheels in order to move the carriage any material amount, yet the adjustment of the compression of the springs 62, and the arrangements in general of the different parts, may be such that more or less control of the position of the carriage is subject to the operator by means of the hand wheel 55, without separating the friction wheels, particularly when the motor is in operation; it being understood that in such a case the hand wheel 55 is continuously rotated by the motor and in order to control more or less the movement of the carriage it is necessary only for the operator to oppose or assist the motor by means of the hand wheel.

The control of the vertical movement of the electrode manually, is provided for in a somewhat similar manner, although any suitable means may be used for the purpose. The hand wheel 65, fixed to the shaft 51, is also continuously rotated by the motor when friction wheels 52 and 53 are in contact and the motor is operating. But when the cross bar 61 is forced forwardly by the cams, and the friction wheels thus are separated, the operator is at liberty to move the electrode vertically as much as may be desired by merely rotating the shaft 51 by means of the hand wheel 65. Also more or less control of the movement of the electrode is possible by means of the hand wheel when the friction wheels are in contact, particularly when the motor is operating.

Any suitable means may be used for clamping the work to be welded to the carriage of the machine. The particular means used depends upon the particular form and size of the articles to be welded. For the purpose of holding articles similar to the tubes 40, I prefer the clamps 70 (Fig. 1). As many clamps as may be desired may be used, depending upon the particular article to be welded. Each of these clamps comprises jaws 71 (Fig. 3) which are fixed to tubes 72 extending parallel with the carriage and rotatably mounted thereon by means of the brackets 73. By suitably rotating these tubes all of the clamps 70 may be opened or closed simultaneously, and to accomplish this I provide, at one end of the machine, arms 74 (Fig. 7) which are fixed to the tubes 72, and a toggle joint 75, pivoted to the ends of the arms 74, so that, when the toggle joint is forced downwardly, the tubes 72 will be rotated and the jaws of the clamps will be closed; and when the toggle is forced upwardly the jaws will be opened.

Any suitable means may be used for operating the toggle joint. I prefer for the purpose the following pneumatic means. A cylinder 76 is fixed to the carriage by means of a bracket 77. In the cylinder is a piston 78, the piston rod 80 being pivoted to the toggle joint, so that, as the piston is forced upwardly or downwardly, the clamps will be operated accordingly due to the corresponding rotation of the tubes 72. In order to operate the piston I provide an ordinary slide valve 81 slidably mounted in the casing 82, the valve being operable by means of a pinion 83 fixed to a pin 84, to which is fixed also an arm 85. The arm 85 may be operated by the handle 86 or by means of a rod 87 connected to the arm 85 by means of a link 88. The rod 87 extends through one of the tubes 72, and projects outwardly from the other end of the tube 72, and on the projecting end of the rod 87 is a handle 90, by means of which the valve 81 may be operated, so that the operator has control of the valve from either end of the carriage. Compressed air is supplied to the valve casing 82, from any suitable source, by means of a pipe 89, and by properly manipulating the valve 81 the piston may be operated in an ordinary manner and the clamps thus may be properly controlled.

Suitable means are provided for adjusting the jaws of the various clamps with reference to each other. One of the jaws 71 (Fig. 5) of one of the clamps is fixed to the corresponding tube 72, by means of a bracket 79; but the jaw may be adjusted on the tube by means of the bolt 91. The other jaw 71 of each clamp is fixed to a bracket 94, which is rotatably mounted on the corresponding tube 72; but the position of this jaw with reference to the tube may be adjusted by means of the screw 93 which is threaded into a bracket 99 adjustably fixed to the tube 72 by a bolt 91. As the inner end of the screw 93 is normally against the rotatable bracket 94 which carries the jaw, the jaw, if necessary, may be forced against the work which is to be welded by turning the screw 93 inwardly. Thus the bolts 91 provide a rough adjustment of the clamp jaws, and the screw 93 provides a convenient and sensitive adjustment of one jaw of each clamp. A lug 126 (Fig. 5) limits the total amount of relative movement of the two brackets, so that the jaw will be moved substantially according to the rotation of the tube 72.

In order to properly center the seams 41 I provide one or more guides 95 (Figs. 15 and 16) which are placed in the seams, and thus bring the seams in a line directly under the electrode and parallel with the path of movement of the tubes. These guides are supported upon brackets 96 rotatably and slidably mounted on supports 97 which in turn are mounted in brackets 98 fixed to the carriage of the machine. The guides may be used in order to align the various seams, and to properly place them, by placing the edge of a guide in the seams of two abutting tubes; and when the tubes are properly clamped the guide brackets 96 may be elevated and turned out of the way, as indicated by dotted lines (Fig. 15). A support 100 for the tubes is also mounted on the support 97.

Any suitable clamping means may be provided for holding the upper end of the electrode. I prefer for the purpose the following described pneumatic clamping or chucking means: An arm 101 (Figs. 17 to 20) is fixed to the upper end of the electrode support 46, and projects outwardly over the central portion of the carriage. Mounted in this arm is a clamp 102 for the electrode, which comprises two jaws 103 and 104. The jaws are slidably mounted in the bore 105 of a casing 106, plugs 107 prevent outward movement in the bore of the jaws; a diaphragm 108, backed by a ring 109, being positioned in the bore between the jaw 104 and its plug 107. Pins 110 prevent rotation of the jaws. A diaphragm chamber 111 is formed in the ring 109, and when compressed air is passed into this chamber, the diaphragm forces the jaw 104 towards the jaw 103, and if the end of the electrode is between the jaws it will be firmly held in place. To operate, at the proper time, the diaphragm 108 I provide, by means of the cylindrical ring 109, an annular chamber 112, around the diaphragm chamber 111, and into which compressed air is supplied by means of a pipe 113 connected to a flexible tube 114 passing downwardly through the hollow support 46, and being connected at its lower end to any suitable source of compressed air. The casing 106 is rotatably mounted in the outer end of the bracket 101. The bracket has an elongated slot 116 through which projects a handle 117 fixed to the casing 106 so that the casing may be rotated. Openings 118 allow at all times the free passage of air from the annular chamber 112 to the diaphragm chamber 111. When the handle 117 is in the position shown by Fig. 19, the compressed air can pass freely into the diaphragm chamber 111 through the passageway 119 and 120. When, however, the handle is turned upwardly, thus rotating the opening 120 from its registering position, the compressed air is shut off. At the same time the opening 121 in the member 106 registers with an opening 122 in the bracket 101, and the compressed air in the diaphragm chamber is released. By this arrangement it will be seen that, by turning the handle 117 upwardly, the jaws of the clamp may be freely opened and the electrode placed in position, and then, by rotating the handle to the normal horizontal position, the jaws are closed against the electrode by the compressed air which enters through the opening 120. A spring 115, when the handle is released, forces the handle to its normal vertical position by means of a plate 123 fixed to the member 106; and when the plate 123 comes in contact with the pin 124, further movement of the device by the spring 115 is prevented. As the diaphragm chamber inlet holes are then in registry the electrode will be continuously held firmly in place.

The lower end of the electrode, when the machine is operating, is held in place by means of an insulation guide member 125 supported by a bracket 126 fixed to the bracket 47 by means of the rod 127. In placing the electrode in the clamp the clamp is lowered manually to such a position as can be conveniently reached by the operator. The arm 117 is then rotated to release the compressed air in the diaphragm chamber 111, and, by this movement, the clamp jaws are turned outwardly so that the electrode may be conveniently placed in the jaws. The handle is then rotated downwardly, manually or by means of the spring 115, allowing the compressed air to enter and close the clamp on the electrode. The electrode support is then elevated, by means of the hand wheel 65, sufficiently to allow the lower end of the electrode to pass downwardly through the guide 125; the lower end of the electrode is then lowered through the guide opening into contact with the work in order to start the arc.

Any suitable automatic means may be used for stopping the welding operation at any desired place with reference to the work, or for opening the motor and welding circuits in case the current becomes too large or too small. For stopping the operation at any desired point of the seam I provide a trip 130 which is adjustably mounted on the carriage, and which, when the desired point has been reached, comes in contact with the pin 132 fixed to the lever 131 which is pivoted to the frame of the machine, thus forcing downwardly the free end 133 of the lever against the spring 129, and carrying with it the rod 134. The rod 134 is pivoted to an arm 135 (Figs. 10 to 13) fixed to a pin 136 mounted in a bracket 137. The bracket 137 is fixed to a bar 138 which in turn is fixed to the frame of the machine by a bracket 140. Also fixed to the pin 136 is an arm 141, which, when the rod 134 is pushed downwardly, thus rotating the pin 136, trips certain mechanism which breaks both the welding circuit and the motor operating circuit by opening the switches 142 and 143, and also separates both pairs of friction rollers.

The switch 142 of the welding circuit is opened by the arm 141 in the following manner: The switch 142 is connected, by a rod 144 (Fig. 6) to an arm 145, projecting from a collar 146 which is fixed to a sleeve 147 rotatably mounted on the shaft 56. Also fixed to the sleeve 147 is a collar 148 which has arms 150 and 151 projecting downwardly therefrom at an angle of about 90° from each other. So that the arms 145, 150 and 151 are relatively immovable. The arm 151 is pivoted to a rod 152 which supports the compression spring 153; and the spring 153 tends at all times, by means of the arm 151, to rotate the sleeve 147 and thus to elevate the rod 144 and open the switch 142. But a rod 155, pivoted to the arm 150, is normally held downwardly so as to prevent rotation of the sleeve 147 and the opening of the switch.

The rod 155 is held downwardly by means of a hook 156 which is pivoted to a casing 157 to which the rod 155 is pivoted; the casing 157 being slidably mounted on the bar 138. Normally the hook 156 is hooked under the shoulder 160 of a pivoted armature 161; and when so hooked the rod 155 will be held downwardly against the compression of the spring 153, and the welding switch will be held closed. But when the hook 156 is released from the shoulder 160 the rod 155 will be pulled upwardly, carrying with it the rods 144 and opening the switch. Hence when the trip 130 strikes on the pin 132, and forces downwardly the rod 134, the arm 141 will be forced against the hook 156, and the hook will be forced out from under the shoulder 160, releasing the rod 155, and the switch will be opened.

When the welding circuit switch is opened, in the manner described, the motor circuit switch 143 will be opened in the following manner: The motor switch arm is connected with a rod 144', which is pivoted to an arm 145' fixed to a collar 146'; and the collar 146' is fixed to the shaft 56. Hence the trip 130, when it opens the switch 142 will open the switch 143, and also will separate the friction wheels, in the following manner: When the hook 156 is released, allowing the spring 153 to rotate the sleeve 147, the sleeve rotates also the arm 158 which is fixed to the sleeve. This arm carries with it the arm 63, by means of pins 159 and 159' (Fig. 24). These pins are mounted in bosses fixed to the respective hubs of the cranks 63 and 158, pin 159 being fixed in the hub of the crank 63, and the pin 159' being slidably mounted in the hub of the crank 158, and being backed by a spring 215. The adjacent ends of the pins are arranged, as indicated, to allow relative movement of the cranks in one direction only. When the crank 158 is rotated counter-clockwise, as is the case when the hook 156 is released, the crank 63 will also be rotated. At the same time the crank 63 may be rotated counter-clockwise, or the crank 158 may be rotated clockwise, without affecting the other crank. Hence, when the hook 156 is released and the crank 158 rotated the crank 63 also is rotated and the arm 145' is turned upwardly, opening the switch 143. The shaft 56 also, at the same time operating cam 60, as hereinabove described, forces the friction wheels apart.

I also provide means for opening the circuits when the motor current becomes too great, due to shortening of the welding arc or to any other causes. This comprises an overload circuit breaker consisting of an electro-magnet 165, which is connected in the motor circuit, and which has an armature 166 pivoted to a bracket 167 which is fixed to the lower end of the rod 138. The armature 166 is pivoted to the bracket by means of the pin 168, and a pin 170 is fixed to an arm 171 projecting from the armature. The pin 170 is normally adjacent the hook 156, and, when the motor current becomes too great, the force of the electro-magnet will draw the armature towards the magnet, causing the pin 170 to strike against the hook and force it from under the shoulder 160, thus releasing the rod 155 and allowing the spring 153 to open both switches. An adjustable compression spring 169 resists the action of the electro-magnet on the armature 166, by means of the pin 172 which rests against the armature 161, so that the overload circuit breaking current may be adjusted to the desired amount.

Similarly, I provide means for opening the circuits when the motor circuit becomes too small. For this purpose I use also the electro-magnet 165, and, in conjunction therewith, the armature 161, which is also pivoted, by the pin 168, to the bracket 167. This armature carries the shoulder 160 which normally holds the hook 156. When, however, the current becomes too low the armature will be forced away by the pressure of the hook against the shoulder 160 and the hook will thus be released, and the switches will be opened by the compression spring 153. The alignment of the pivot of the hook, the pivot 168, and the shoulder 160 is such that the spring 153 will tend to pull the armature 141 away from the magnet, and will do so when the current reduces to a predetermined amount. The switches may be opened manually by merely pressing downwardly on the pin 132.

As the pins 159 and 159' normally prevent rotation clockwise of the crank 63 without rotating the crank 158, I provide means whereby the crank 63, when the welding switch is open, may be rotated to close the motor switch, or to bring the friction wheels together, without affecting the crank 158. These means comprise a pin 216 projecting outwardly from the slidable pin 159'. When the hook 156 is released, and the crank 158 is rotated, opening the switches, the pin 216 comes in contact with the cam 217, and the pin 159' is forced, against the spring 215, away from the pin 159. Thus the crank 63 is free to be rotated clockwise to close the motor switch 143, or to bring the friction wheels together, without affecting the crank 158. Hence, inasmuch as the crank 63 can always be rotated counterclockwise independently of the crank 158, the operator has means for opening the motor switch when the welding switch is closed or open or for closing the motor switch when the welding switch is open.

In electric welding it is sometimes desirable to have, what I term for convenience, chills for cooling the welding material, to prevent dripping of the material through the seam and for other reasons. Any suitable chilling means may be used in connection with my machine, but for the purpose I prefer the following: A metallic head 180 is mounted upon a tube 181 in such a manner as to be held, at all times, under the welding electrode, at the point where the welding is being carried on. And means are provided for keeping the head at the proper temperature, and for regulating the exact position of the head with reference to the weld; it being understood that the head itself is stationary but moves relative to the tube which is being welded as the welding process is going on or at any other time that the tube is moved. The chilling support is supported by means of a rod 182, fixed to the end of the frame, upon which is adjustably mounted a bracket 183. Pivoted to one arm of the bracket 183 is a block 184 through an opening in which passes the other end of the tube 181. The tube also passes through an opening in a block 185 which is supported by means of an adjustable spring 186; undue upward movement of the block 185 being prevented by means of a screw 187. The spring thus supports the chill head end of the rod and holds the head against the seam which is being welded. The compression of the spring 186 is adjustable by means of a screw 188. By these means the chill 180 is not only supported, but may be very sensitively adjusted in position; at the same time it is yieldingly supported so that in case of any necessity it will give somewhat without straining any of the parts.

The temperature of the chill head may be kept suitably low by the use of any cooling fluid such as air or water. The fluid is passed from any suitable source into the tube 181, by means of an inlet 181'. It then passes into the head 180 and then out by means of an inner tube 182', and an outlet tube 183'. It is to be understood, however, that the passage of the fluid may be reversed if desired.

In use it is desirable to have the head easily removable from the tube 181, for repairs or otherwise, and it is also desirable to have it easily rotatable on the tube; so that when one portion becomes worn or burned another portion may be turned to face the weld. For these purposes I provide a conical end on the tube 181, and a similar conical bore in the head 180; so that the head may be slipped snugly on the tube. A bolt 184, screwing into the bore of the tube 180 may be used if desired for holding the head more firmly on the tube and for closing the end of the tube opening.

I have found it desirable to provide means to oppose more or less the tendency of the electrode support 46 to move downwardly. As is well understood in welding long seams a long electrode is often required, and the weight of the electrode and support is frequently great, and it becomes desirable to overcome the force of gravity more or less, by special means. Any suitable means may be used for the purpose. I prefer friction means consisting of a casing 189 (Fig. 21) mounted on the bracket 47 and fixed thereto by a strap 190. Within this casing are members 191, which altogether, form an annular conical shaped member fitting into the annular conical chamber 192 within the casing 189. The upper end of the casing is closed by an annularly shaped member 193 which presses downwardly on springs 194. The springs 194 press against the members 191, and thus cause more or less friction between the walls of the casing 189 and the walls of the supporting tube 46; and, as the tube 46 moves downwardly, the friction between the walls of the tube 46 and the inner surface of the members 191 tends to force these members downwardly and to cause them to press with more force against the tube 46, thus offering to the downward movement of the tube material resistance depending upon the compressive force of the springs 194. On the other hand, when the tube 46 is raised by means of the hand wheel 65, the friction between the members 191 and the tube tends to elevate the members and thus to decrease very materially the force with which those members press upon the tube; so that the friction when elevating the tube is very materially less than when the tube is being lowered.

In operating my machine any suitable electric system may be used for the welding circuit, and also for the motor circuit. The system which I prefer is similar to the one described in my copending application for patent, Serial Number 356,377, filed February 5, 1920, to which application reference may be had for a more complete description thereof. But to more clearly show the application of the system to this machine the following description is desirable: In carrying out my invention I prefer to use alternating electric current of any suitable voltage generated by any suitable generator such as the alternator 200 designed to generate the proper voltage and current. I connect the welding circuit and the motor circuit in parallel, as indicated in Fig. 2. In order to avoid confusion the electric wiring is omitted from all of the drawings except Fig. 2. The welding circuit comprises the wire 201 from the generator, the line switch 202, the wire 203, the welding circuit switch 142, the adjustable reactance coil 213, the electric cable 204 passing through the hollow electrode support 46 and to the clamp bracket 101; it being understood that the outer end of the clamp bracket is insulated from the inner end by the insulation 205. The circuit then comprising the clamp 102 the welding electrode 43, the welding arc 206, the tube 40 which is being welded, the frame of the machine 20, the wire 207, which is grounded to the frame, the switch 142, and the wire 208 back to the line switch 202. The motor circuit is in parallel with the arc, and comprises the frame 20, the motor controller 210, the motor 211, the wire 212, the electromagnet 165, the motor switch 143, and the line 214, which connects with the wire 204 of the welding circuit.

Thus it will be seen that the two circuits are in parallel, both supplied by the same electric source; each receiving current through the reactance coil 263. Hence, as is well understood, the drop in the voltage across the terminals of the motor and the motor current, will be affected more or less by the length of the electric arc 206. As the length of the arc increases the flow of current therethrough decreases and the current through the motor increases; and the motor speed thus increases and feeds the electrode more rapidly; and as the arc decreases in length the flow of current through the motor decreases also and thus retards the speed of the motor. In this manner the feeding of the electrode depends upon the length of the arc; and, as is more fully set forth in my said copending patent application, the length of the arc is, by this electric system, maintained substantially uniform at all times.

The machine when in use is operated in the following manner: The articles to be welded are placed substantially in position in the clamps, and the clamps are tightened slightly by shifting the rod 87 and allowing a little compressed air to enter the cylinder 76, thus forcing the piston 78 downwardly and closing the clamps on the work. The centering devices 95 are then brought into position to properly place the seams of the tubes. When the tubes are properly centered the full pressure of air is applied to the clamps, which then hold the tubes firmly in place. The chill head having been previously been properly adjusted so as to be positioned immediately under the electrode holder, the left hand wheel 55 is turned to shift the right hand tube to the right until the chill head enters the tube and the point in the seam where the weld is to begin is placed immediately under the electrode holder. The fluid for cooling the chill is then allowed to circulate through the chill and chill holder, and this circulation continues ordinarily during the entire welding process. The electrode is then placed in the clamp 102 by pushing the handle 117 upwardly, thus releasing the compressed air in the diaphragm chamber 111 and bringing the electrode clamp forward so that the end of the electrode may be entered conveniently. The handle is then released and the spring 115 automatically rotates the casing 106 so as to allow compressed air to enter the diaphragm chamber and lock the electrode in the clamp, and, at the same time, the clamp is rotated to face downwardly. The right hand wheel 65 is then rotated to raise the electrode sufficiently to place the arc end of the electrode through the insulated guide bushing 125. The same hand wheel is then turned to lower the electrode until the lower end is adjacent the tube to be welded. The handle 158 is then turned downwardly to close the switch of the welding circuit, and to lock the hook 156 in place. The electrode is then lowered by the hand wheel 56 into contact with the tube to be welded. This allows the welding current to pass, and, as the electrode starts fusing it is quickly elevated slightly so as to form a proper electric arc. The handle 63 is then turned downwardly to close the motor switch and to operate the cam 60 so as to release the springs 62, allowing the friction disks to come in contact with the friction wheels. The closing of the motor switch causes the motor to start; and, when the friction wheels come together the motor puts in operation the entire machine, shifting the tubes horizontally and the electrode vertically as the welding proceeds.

When the seams have been welded to the point where it is desired to stop the machine, the trip 130, which has been properly set, trips the hook 156 and opens both of the switches, cutting off all the electric energy from the machine. This action also by rotating the shaft 56, as hereinabove described, compresses both of the main springs 62, and thus separates the two pairs of friction wheels, and brings the entire machine to rest and in position for starting a new operation. The carriage is then moved to normal position by turning the left hand wheel; the air valve 81 to the clamping cylinder 76 is operated to shut off the compressed air to the cylinder and to allow the compressed air in the cylinder to exhaust so that the clamps 70 may be opened; and the welded tubes are then removed from the machine. It is to be understood, however, that this description is merely for the purpose of illustrating the particular steps which are pursued in this particular case; but that the order of the steps may be changed, and various other steps may be taken in applying the machine to other uses.

Although I have described with much detail various elements of my machine, yet it is to be understood that many modifications may be made therein without departing from the spirit of my invention as disclosed by the following claims:

I claim as my invention:

1. In a welding machine a frame, an electrode support slidably mounted on said frame, a work support slidably mounted on said frame, driving means, friction operable means operatively connecting said electrode support with said driving means, and friction operable means operatively connecting said work support with said driving means.

2. In a welding machine a frame, an electrode support slidably mounted on said frame, a work support slidably mounted on said frame, driving means, friction operable means operatively connecting said electrode support with said driving means, friction operable means operatively connecting said work support with said driving means, and means for simultaneously disconnecting both of said friction means.

3. In a welding machine a frame, an electrode support slidably mounted on said frame, a work support slidably mounted on said frame, driving means, friction operable means operatively connecting said electrode support with said driving means, friction operable means operatively connecting said work support with said driving means, and manual means for operating said electrode support independently of said driving means.

4. In a welding machine a frame, an electrode support slidably mounted on said frame, a work support slidably mounted on said frame, driving means, friction operable means operatively connecting said electrode support with said driving means, friction operable means operatively connecting said work support with said driving means, and manual means for operating said electrode support and said work support independently of said driving means.

5. In a welding machine a frame, an electrode support slidably mounted on said frame, a work support slidably mounted on said frame, driving means, friction operable means operatively connecting said electrode support with said driving means, friction operable means operatively connecting said work support with said driving means, means for simultaneously disconnecting both of said friction means, and manual means for operating said work support when said friction means are disconnected.

6. In a welding machine a frame, an electrode support slidably mounted on said frame, a work support slidably mounted on said frame, driving means, friction operable means operatively connecting said electrode support with said driving means, friction operable means operatively connecting said work support with said driving means, means for simultaneously disconnecting both of said friction means, and manual means for operating said work support and said electrode support when said friction means are disconnected.

7. In a welding machine a frame, an electrode support slidably mounted on said frame, a work support slidably mounted on said frame, driving means, friction operable means operatively connecting said electrode support with said driving means, friction operable means operatively connecting said work support with said driving means, and means for simultaneously disconnecting both of said friction means, said disconnecting means comprising a cam, and manual means for operating said cam, said cam being arranged when operated to separate both of said friction means.

8. In a welding machine a frame, an electrode support slidably mounted on said frame, a work support slidably mounted on said frame, driving means, friction operable means operatively connecting said electrode support with said driving means, and friction operable means operatively connecting said work support with said driving means, each of said friction means comprising a friction disk and a friction roller arranged to run against said disk.

9. In a welding machine a frame, an electrode support slidably mounted on said frame, a work support slidably mounted on said frame, driving means, friction operable means operatively connecting said electrode support with said driving means, and friction operable means operatively connecting said work support with said driving means, each of said friction means comprising a friction disk, a friction roller arranged to run against said disk, and means for adjusting the position of said roller with reference to said disk.

10. In a welding machine a frame, an electrode support slidably mounted on said frame, a work support slidably mounted on said frame, driving means, friction operable means operatively connecting said electrode support with said driving means, and friction operable means operatively connecting said carriage with said driving means, each of said friction means comprising a friction disk, a friction roller arranged to run against said disk, and means for simultaneously separating both of said disks from said rollers.

11. In a welding machine a frame, a carriage slidably mounted on said frame for supporting the work to be welded, a motor operatively connected with said carriage, a motor driving circuit operatively connected with said motor, a switch in said circuit, resilient means tending to open said switch, means normally overcoming the said tendency of said resilient means, and means connected with said carriage for rendering inoperative said overcoming means when said carriage reaches a predetermined position on said frame.

12. In a welding machine a frame, a carriage slidably mounted on said frame, driving means operatively connected with said carriage, and means for rendering inoperative said driving means when said carriage reaches a predetermined point on said frame, said latter means comprising a switch operatively connected in said driving means, means tending to open said switch, means normally opposing said latter means, and means adapted to render inoperative said opposing means when said carriage reaches a predetermined point.

13. In a welding machine a carriage, a motor, a circuit for operating said motor, operating means connecting said motor and said carriage, and means operated by said carriage for disconnecting said circuit and said operating means.

14. In an electric welding machine means for supporting an electrode, said means comprising a support, a clamp mounted on said support, means for supplying compressed air to said clamp and means for releasing the compressed air from said clamp, and means for rotating said clamp in said support whereby the end of the electrode may be more conveniently passed into said clamp.

15. In an electric welding machine means for supporting an electrode comprising a casing having a chamber therein, two jaws mounted in said chamber, a diaphragm crossing said chamber and positioned adjacent and normally in contact with one of said jaws, means for passing compressed air into said chamber, and means for exhausting the air from said chamber.

16. In an electric welding machine means for supporting an electrode comprising a casing having a chamber therein, a slidable jaw in said casing, a diaphragm dividing said chamber and positioned adjacent said slidable jaw, means for passing compressed air into said chamber, and means for exhausting the air from said chamber.

17. In an electric welding machine a frame, a bracket fixed to said frame, an electrode support comprising a bar vertically and slidably mounted in said bracket, a member mounted in said bracket having a beveled side, one surface of said member being positioned against the surface of said support, the beveled portion of said member being positioned against the surface of said bracket, and resilient means tending to force said member downwardly, whereby the friction between said member and said support, due to said beveled surface is increased.

18. In a welding machine a frame, a bracket mounted on said frame, said bracket having a vertical cylindrical opening therethrough, the lower end of said opening being conical, and converging inwardly, a cylindrical electrode support vertically and slidably positioned in said opening, a plurality of members positioned in said opening around said support, the lower edges of said openings being conical in shape and fitting into said conical bracket opening, and resilient means tending to force said members downwardly thereby increasing the friction between said members and said support.

19. In a welding machine a frame, a bracket mounted on said frame, said bracket having a vertical cylindrical opening therethrough, the lower end of said opening being conical, and converging inwardly, a cylindrical electrode support vertically and slidably positioned in said opening, a plurality of members positioned in said opening around said support, the lower edges of said openings being conical in shape and fitting into said conical bracket opening, resilient means tending to force said members downwardly thereby increasing the friction between said members and said support, and means for adjusting the force of said resilient means.

20. In a welding machine work clamping means comprising a plurality of clamps, pneumatic means for simultaneously operating all of said clamps, and means for independently adjusting the openings of said clamps.

21. In a welding machine work holding means comprising two bars rotatably mounted on said machine adjacent to and parallel with each other, a plurality of clamps, each of said clamps comprising a pair of jaws opposing each other and mounted on said respective bars, and means for rotating said bars to open and close said clamps.

22. In a welding machine work holding means comprising two bars rotatably mounted on said machine adjacent to and parallel with each other, a plurality of clamps, each of said clamps comprising a pair of jaws opposing each other and mounted on said respective bars, and means for rotating said bars to open and close said clamps, said means comprising an arm fixed to each of said bars, the outer ends of said arms being spaced a material distance apart but substantially opposite each other, and means for forcing said arms closer together or farther apart.

23. In a welding machine work holding means comprising two bars rotatably mounted on said machine adjacent to and parallel with each other, a plurality of clamps, each of said clamps comprising a pair of jaws opposing each other and mounted on said respective bars, and means for rotating said bars to open and close said clamps, said means comprising an arm fixed to each of said bars, the outer ends of said arms being spaced a material distance apart but substantially opposite each other, and pneumatic means for forcing said arms closer together or farther apart, said pneumatic means comprising a cylinder, a piston slidably mounted in said cylinder, means operatively connecting said piston to said arms, and means for passing compressed air into either end of said cylinder.

24. In an electric welding machine means for cooling the weld, said means comprising a chill head mounted adjacent the welding end of the electrode, but arranged to be on the side of the seam opposite said electrode, and means for holding said head against the welding portion of the seam.

25. In an electric welding machine means for cooling the weld, said means comprising a chill head mounted adjacent the welding end of the electrode, but arranged to be on the side of the seam opposite said electrode, and means for holding said head against the welding portion of the seam, said means comprising adjustable resilient means.

26. In an electric welding machine means for cooling the weld, said means comprising a chill head mounted adjacent the welding end of the electrode but arranged to be on the side of the seam opposite said electrode, means for holding said head against the welding portion of the seam, said means comprising adjustable resilient means, and adjustable means for holding the weld downwardly when removed from said work.

27. In an electric welding machine means for cooling the weld comprising an electric chill head arranged to be positioned adjacent the welding arc, and means for passing a cooling fluid into and out of said chill head.

28. In an electric welding machine means for cooling the weld, said means comprising a chill head mounted adjacent the welding end of the electrode, but arranged to be on the side of the seam opposite said electrode, and means for holding said head against the welding portion of the seam, said chill head having a chamber therein, said supporting means comprising a tube fixed to said head, the bore of said tube opening into said chamber, an inner tube extending through said supporting tube and projecting into said head, and means for passing a fluid into one of said tubes through said head and out of the other tube.

29. In a welding machine means for centering a seam to be welded, said means comprising a support, a bracket slidably and rotatably mounted on said support, and a member fixed to said bracket and adapted to enter said seam.

30. In a welding machine means for centering a seam to be welded, said means comprising a support, a bracket slidably and rotatably mounted on said support, a member fixed to said bracket and adapted to enter said seam, and a bracket for supporting the work to be welded fixed to said support.

31. In a welding machine adapted to weld seams in a plurality of articles, means for registering and centering the seams, comprising a support fixed to said machine, a bracket adapted to support the adjacent ends of two articles to be welded, a second bracket slidably and rotatably mounted on said support, and a member fixed to said latter bracket and arranged to project into the adjacent ends of the seams in said two articles to be welded.

32. In a welding machine adapted to weld seams in a plurality of articles, means for registering the seams, comprising a support fixed to said machine, a bracket adapted to support the adjacent ends of two articles to be welded, a second bracket mounted on said support, and a member fixed to said latter bracket and arranged to project into the adjacent ends of the seams in said two articles to be welded.

33. In a welding machine a welding circuit, a motor circuit operatively connected in parallel with said welding circuit, and an overload circuit breaker operatively connected in said motor circuit, said overload circuit breaker comprising an electro-magnet and an overload armature arranged to cooperate with said magnet.

34. In a welding machine a welding circuit, including an electrode, a reactance coil connected in said circuit, and a motor circuit connected in parallel with said welding circuit.

35. In a welding machine a welding circuit, including an electrode, a reactance coil connected in said circuit, and a motor circuit connected in parallel with said welding circuit, the said motor circuit being connected to said welding circuit between said reactance coil and said electrode.

36. In a welding machine a frame, a welding electrode, a source of electric energy, a reactance coil, a welding circuit passing from said source of supply through said reactance coil, said electrode and a portion of said frame, and a motor operating circuit one side of said motor circuit being connected to said welding circuit between said reactance coil and said electrode.

37. In a welding machine a frame, a welding electrode, a source of electric energy, a reactance coil, a welding circuit passing from said source of supply through said reactance coil, said electrode and a portion of said frame, and a motor operating circuit one side of said motor circuit being connected to said welding circuit between said reactance coil and said electrode, the other side of said motor circuit being connected to said frame.

38. In a welding machine a welding electrode, including an electrode, a reactance coil connected in said circuit, a motor circuit connected in parallel with said welding circuit, the said motor circut being connected to said welding circuit between said reactance coil and said electrode, and an overload circuit breaker in said motor circuit.

39. In a welding machine, a welding circuit and a motor driving circuit, a switch in each of said circuits, means for opening both of said switches simultaneously, and means for closing said motor switch independently of said welding switch when said welding switch is open.

40. In a welding machine, a welding circuit and a motor driving circuit, a switch in each of said circuits, means for opening both of said switches simultaneously, and means for closing said motor switch independently of said welding switch when said welding switch is open, or for opening said motor switch independently of said welding switch when said welding switch is closed.

41. In an electric welding machine, a support, and a chill head rotatably mounted on one end of said support, and means for cooling said head.

42. In an electric welding machine a tubular support, a chill head having a bore into which the end of said support passes, and means threaded into said support end rotatably holding said head in said support.

43. In an electric welding machine a support having a conical end, and a chill head having a conical bore, said conical end arranged to fit snugly but rotatably into said bore.

In testimony whereof, I hereunto set my hand.

JOSEPH W. FAY.